Patented Feb. 4, 1930

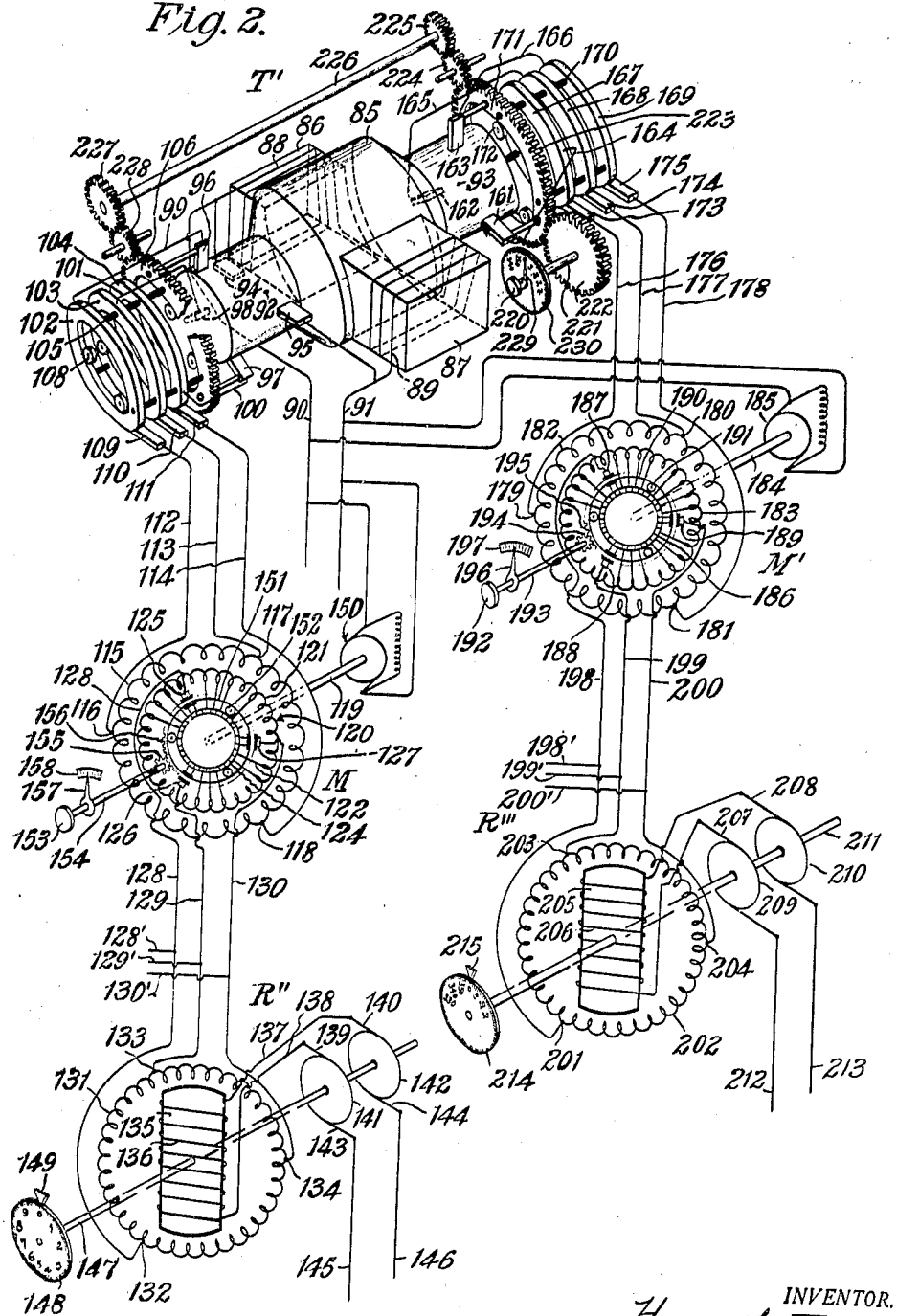

1,745,961

UNITED STATES PATENT OFFICE

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK

TRANSMISSION SYSTEM

Application filed July 8, 1924. Serial No. 724,912.

This invention relates to transmission systems particularly adapted for transmitting signals from a sending station to one or more receiving stations.

For such purposes it has been proposed to use direct current systems of the step-by-step type. These systems are limited in the number of positions which can be obtained by a unit comprising a transmitter and a receiver controlled thereby and in order to obtain the number of positions usually required it is necessary to provide a number of units for transmitting indications with different degrees of fineness, and to arrange for this consecutive actuation of the units to enable the desired indications to be ultimately set up.

In an attempt to overcome the disadvantages of such step-by-step systems, particularly with respect to the number of positions obtainable, use has been made of alternating current systems, each of which includes a transmitter having a transmitting generator or controller and one or more receivers, each having a synchronous motor movable in accordance with the transmitter generator. In a system of this type, improper deflection of a receiver will cause reaction on the transmitter and also, in case of a plurality of receivers under the control of the same transmitter, interfere with the indications of the other receivers. Furthermore, in case the rotor of the receiver is given a sudden impulse there is a tendency to set it spinning at a certain high speed in definite relation to the frequency of the supply current, and to cause loss of control of the receiver by the transmitter. In such alternating current systems it is also necessary to make provision of means for damping the action of the receiver.

Some of the objects of the invention are to provide: a transmission system which will be efficient in operation and economical to install and maintain; a system in which it is possible to set a receiver by means of the corresponding transmitter to substantially any angular position desired; a system in which improper deflection of one receiver will have no reaction on the transmitter; a system, containing a plurality of receivers, in which improper deflection of any receiver will cause no interference with the others, and a system in which there is inherent magnetic damping of each receiver.

The above objects as well as others which will hereinafter appear are attained according to one form of the invention, by use of a direct current armature and an associated commutator with which contact three brushes set substantially 120° apart and connected with slip rings, which together with the brushes are mounted for rotation about the axis of the commutator to permit variation of the position of the brushes. From the slip rings, connection is made by brushes and suitable conductors with the three-phase stator of a motor of which the rotor is energized by direct current and acts to indicate at the receivers the signals set up at the transmitter. By shifting the brushes at the transmitter, the magnetic field of the stator will be changed and consequently the receiver rotor will be turned as required. It should be understood that either the field or the armature of the receiver motor may be the stator and the other the rotor. Provision for coarse and fine transmitters and receivers may be made by providing a second set of brushes to engage the commutator, and a corresponding motor, the connections between the second set of brushes and the corresponding motor being similar to those between the first set of brushes and the first mentioned receivers. To effect coarse and fine transmission the two sets of brushes are mounted on independent rotatable rings connected by suitable gearing with a transmitter indicator or handle so that upon rotation of such handle the brushes of the fine transmitter will be displaced to a much greater extent than those of the coarse transmitter, the gear ratios being such that indications on the fine receiver will be in smaller units than those on the coarse receiver.

The transmitter armature may be driven by a separate motor or the driving may be effected either by providing an additional winding on the transmitter armature or in a two pole machine a pair of brushes spaced 180° apart on the same commutator as a three-brush set. Several receivers may be controlled by a single set of brushes and, when desired, devices in the nature of relays may be inserted between the transmitters and receivers. The particular nature of the invention will appear more clearly from a description of certain preferred embodiments thereof as shown in the accompanying drawings in which:

Fig. 2 is a representation of a system embodying a modified form of the invention.

Figure 1:
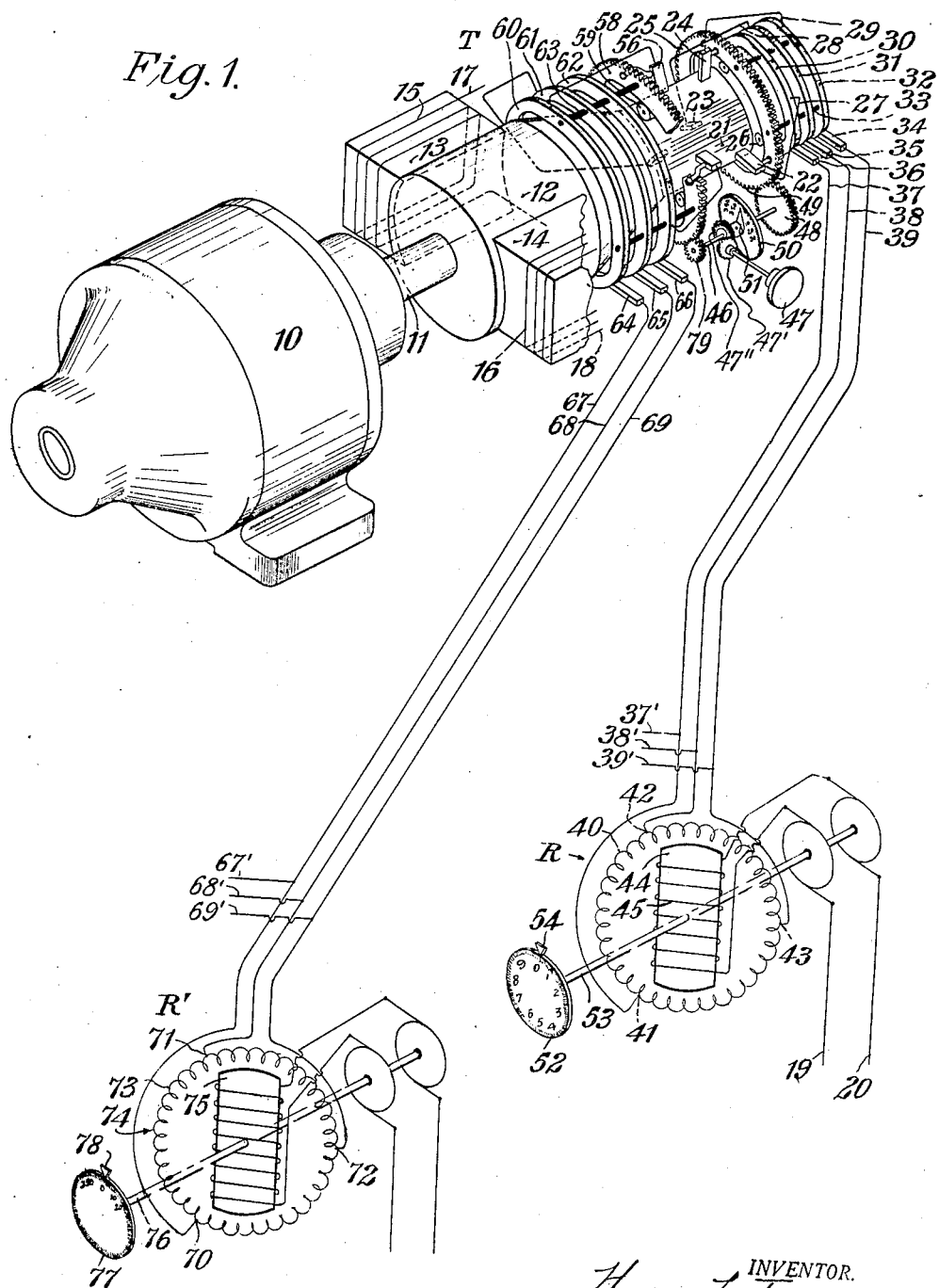
Fig. 1 is a representation of a system embodying one form of the invention.

Referring particularly to Figure 1 a motor 10 acts through a shaft 11 to rotate a direct current armature 12 between two poles 13 and 14 energized by coils 15 and 16 connected by conductors 17 and 18 with direct current mains. At one end of the armature 12 is a commutator 21 with which contact three brushes 22, 23 and 24 spaced 120° apart and mounted on a ring 25 which is supported for rotation by rollers 26 engaging the inner edge thereof. The brushes 22, 23 and 24 are insulated from the ring 25 and connected by leads 27, 28 and 29 respectively with slip rings 30, 31, and 32 which are also mounted on rollers 26 and by means of insulating member 33 are connected with the ring 25 to rotate therewith. The armature 12, commutator 21, and brushes 22, 23, 24 form part of a transmitter T.

Contacting with the rings 30, 31 and 32 respectively are brushes 34, 35 and 36 which are connected by conductors 37, 38 and 39 with the winding of a three-phase stator or armature 40 of a receiver motor at points 41, 42 and 43 respectively. As indicated by the leads 37′, 38′ and 39′ more than one receiver motor may be controlled by one set of brushes 22, 23 and 24. When the armature 12 is rotating certain potential conditions are set up at the three brushes 22, 23 and 24 which set up at the points 41, 42 and 43 differences of potential corresponding to the instantaneous values in an alternating current circuit and set up a magnetic field which acts on a field magnet or a rotor 44 energized by current from the direct current mains, passing through the winding 45 of the rotor. Rotation of the brush ring 25 will change the potential conditions at the points 41, 42 and 43, thereby rotating the magnetic field of the armature 40 and causing the rotor to assume a different position. It should be understood that either the armature or the field can be made the rotor and the other the stator.

In order that indications at the transmitter T and at the receiver R may be set up provision is made of a shaft 46 operable by a handle 47 through bevel gears 47′ and 47″ and having thereon a gear 48 meshing with teeth 49 on the periphery of the ring 25, the gear 48 and the toothed periphery of the ring 25 being so proportioned so as to give the proper gear ratio. Provision may also be made of a fixed dial 50 and a suitable pointer 51 on the shaft 46 to enable the transmitter T to be set in accordance with the signal to be transmitted. In order that the signal set up at the transmitter T may be read at the receiver R provision is made of a dial 52 on the rotor shaft 53 to cooperate with a fixed pointer or index 54. Although the transmission of signals has been described as effected by turning the brushes and the supporting ring 25 about the axis of the armature 12, it should be understood that the fundamental feature resides in the relative shifting of the brushes and the field poles 13 and 14 which effect could be obtained by shifting the poles.

Such a transmission system may have only one kind of receiver, but, as shown in Fig. 1 the present system includes two receivers, R and R′, the receiver R just described being the fine receiver and R′ being the coarse receiver. To control the coarse receiver R′ provision is made of a second set of brushes, only one of which 56 is numbered, contacting with the commutator 21 and mounted on a ring 58 supported by rollers 59. These brushes are insulated from the ring 58 and connected respectively with slip rings 60, 61 and 62 connected by members 63 of insulating material, therewith. As in the case of the other receivers, slip rings 60, 61 and 62 connected by brushes 64, 65, 66 and conductors 67, 68 and 69 respectively with points 70, 71 and 72 on the winding 73 of a three-phase stator or armature 74 with the effect of turning the rotor 75 and the rotor 76 when the corresponding brushes of the transmitter T are turned to a different position. The rotor shaft 76 is provided with a dial 77 to cooperate with a pointer 78, the dial 77 being graduated for larger units than the dial 52 of the fine receiver.

By means of leads such as 67′, 68′ and 69′ one or more other coarse receivers may be operated from the coarse transmitter T. The ring 58 is also connected with the shaft 46 by means of teeth on the ring meshing with a gear 79 on the shaft 46. It should be understood that the gear 79 and toothed ring 58 must be of such dimensions as to have the desired gear ratio. Upon turning the handle 47 to set up the proper signal by means of the dial 50, and the pointer 51, the fine and coarse receivers R and R′ will indicate the fine and coarse components of the signal set up at the dial 50 of the transmitter T.

In Fig. 2 is shown another form of transmission system including a transmitter T′, fine and coarse receiver R″ and R‴, respectively, and motor relays M and M′, respectively. In this system a direct current armature 85 is mounted to revolve between two poles 86 and 87 whose coils 88 and 89 receive current from direct current mains 90 and 91. The armature 85 is provided with commutators 92 and 93 at opposite ends thereof, the commutator 92 being engaged by brushes 94 and 95 connected respectively with the main 90 and 91. It will be apparent that by the arrangement just described provision is made of a shunt motor of which the armature 85 will be rotated when current is supplied from the mains 90 and 91.

The commutator 92 is also engaged by three brushes 96, 97 and 98 spaced 120° apart and corresponding to the brushes in either of the sets shown in Fig. 1. The brushes 96, 97 and 98 are connected by leads 99, 100 and 101 with slip rings 102, 103, and 104 which are connected by insulating members 105 with a ring 106 on which the brushes 96, 97 and 98 are supported. The slip rings 102, 103 and 104 and rings 106 are rotatably supported by rollers 108 engaging the inner face of the rings thus enabling the brushes 96, 97 and 98 to turn to different position with respect to the commutator. The motor relay M, which is used in connection with the brushes 96, 97 and 98, gives greater power for actuating receiver motors and renders it possible to control a larger number of receivers from a set of brushes at the transmitter T'.

Contacting with the rings 102, 103 and 104 respectively are brushes 109, 110 and 111 which are connected by conductors 112, 113 and 114 to a field winding 115 of the motor relay M at points 116, 117, and 118. Mounted on a shaft 119 to rotate in the field coil 115 is a direct current armature 120 comprising a large number of turns 121 connected at intervals by leads 122 to bars of a commutator 124 which is engaged at points substantially 120° apart by brushes 125, 126 and 127 connected by conductors 128, 129 and 130 respectively with the winding of a three phase stator or armature 131 of a receiver R" at points 132, 133 and 134. A magnetic field is thus set up which causes a rotor 135 energized by a direct current through its coil 136 to turn under control of the brushes 96, 97 and 98, current being supplied to the coil 136 through conductors 137, 138, brushes 139 and 140, slip rings 141 and 142 and brushes 143 and 144 connected with direct current mains 145 and 146. Mounted on a shaft 147 which carries the rotor 135 and slip rings 141 and 142 is a graduated dial 148 with which cooperates a pointer 149 to indicate the angular position of the rotor 135. It will be evident that by providing leads 128', 129' and 130' additional fine receivers may be controlled by the transmitter T'.

The armature 120 and the associated commutator 124 are turned continuously by a shunt motor 150 which is connected with the mains 90 and 91. Ordinarily there is no shifting of the brushes 125, 126 and 127 but they may be moved for the purpose of adjusting the position of the indicator in receiver R" with reference to the transmitter T'. To this end the brushes 125, 126 and 127 are mounted in a ring 151 rotatably supported by the rollers 152 engaging the inner face thereof and such adjustment of the ring is effected by means of a handle 153 on a shaft 154 carrying a gear 155 meshing with teeth 156 on the ring 151, the amount of the adjustment being regulated in accordance with the position of a pointer 157 with reference to the readings on a scale 158. It should be understood that, in the motor relay M, the magnetic field is turned by the shifting of the brushes 96, 97 and 98 and that such turning of the magnetic field causes a variation in the potential conditions at the brushes 125, 126 and 127.

Contacting with the commutator 93 are brushes 161, 162 and 163 used for coarse transmission and connected, respectively, by leads 164, 165 and 166 with slip rings 167, 168 and 169 connected by insulating members 170 with a brush carrying ring 171. The slip rings 167, 168 and 169 and the brush carrying ring 171 are rotatably mounted by means of rollers 172 so that by rotating this structure the position of the brushes 161, 162 and 163 may be changed. Contacting with the slip rings 167, 168 and 169 are brushes 173, 174 and 175 respectively which are connected by leads 176, 177 and 178 at points 179, 180 and 181 with the field coil 182 of a motor relay M' comprising an armature 183 on a shaft 184 which is rotated by a shunt motor 185 connected with the power mains 90 and 91. The armature 183 which is of direct current type has a commutator 186 with which engage brushes 187, 188 and 189 carried by a ring 190 rotatably mounted on rollers 191 for adjustment by means of a handle 192. For such adjustment the handle 192 is mounted on a shaft 193 carrying a pinion 194 meshing with teeth 195 on the ring 190. The angular position of the handle 192 may be determined by a pointer 196 cooperating with a fixed scale 197.

The brushes 187, 188 and 189 are connected respectively by leads 198, 199 and 200 with points 201, 203 and 204 of the winding of a three-phase stator or armature 202 forming part of the receiver motor of a coarse receiver R''' having a rotor 205 the coil of which 206 is energized by means of connections 207, 208, slip rings 209 and 210 mounted on the rotor shaft 211 and connections 212 and 213 to any source of direct current such as the mains 90 and 91. The angular position of the rotor 206 is indicated by the position of the dial 214 on the shaft 211 and cooperating with a fixed pointer 215. It will be evident that by providing leads 198', 199' and 200' other coarse receivers may be controlled by the transmitter T'.

Control of the receivers R" and R''' is effected by means of a handle 220 on a shaft 221 which also carries a gear 222 meshing with teeth 223 on the peripheral face of the brush ring 171. By turning the handle 220 of the transmitter T', the position of the brushes 161, 162 and 163 on the commutator 93 may be varied and the corresponding receiver turned in accordance with such shifting. For turning the brush ring 106 motion may be transmitted thereto from the brush ring 171 by means of a gear 224 meshing with the teeth on the ring 171 and also with a gear 225 mounted on shaft 226 from which motion is transmitted to ring 106 by means of gears 227 and 228.

It will be seen that the gear ratios are such as to cause the brush ring 106 to be revolved more rapidly than brush ring 171, and that brush ring 106 controls the fine receiver R'' and the brush ring 171 controls the coarse receiver R'''. The signal to be transmitted is set up by turning the handle 220 of the transmitter T' so that a pointer 229 fixed on the shaft 221 will give a proper reading on a fixed dial 230. The fine and coarse components of the signal will then be set up at the fine and coarse receivers R'' and R''', respectively.

It will be understood that in the operation of the system as the rings carrying the brushes are shifted, polyphase alternating currents are set up in the circuits of the receivers, the frequency of which varies in accordance with the angular velocity of the brushes. At zero angular velocity of the brushes the frequency drops to zero resulting in a direct current system which is the special case of alternating current when its frequency becomes zero.

While certain preferred embodiments of the invention have been shown and described it will be understood that it may be embodied in other forms and that various changes in its details of construction may be made without departing from its principle as defined in the appended claims.

I claim:—

1. In a system for transmitting data from one point to another, means for producing a magnetic field, a direct current armature associated with said means, a plurality of sets of movable brushes for taking current from the armature, a plurality of polyphase receiver motors for different components of the transmitted data, means for producing relative shifting between the sets of brushes and between the sets of brushes and the magnetic field and electric connections between the brushes and the motors whereby the motors are actuated in accordance with the different components of the transmitted data.

2. In a system for transmitting data from one point to another, means for producing a magnetic field, a direct current armature associated with said means, a plurality of sets of movable brushes for taking current from the armature, a plurality of polyphase receiver motors for different components of the transmitted data, a member adapted to be set in accordance with the data to be transmitted, means actuated by the member for producing relative shifting between the sets of brushes and between the sets of brushes and the magnetic field and electric connections between the brushes and the motors whereby the motors are actuated in accordance with the different components of the transmitted data.

3. In a transmission system, a plurality of polyphase receiver motors adapted to be turned to different positions by setting up at the armature leads thereof different direct current potential conditions, a transmitter comprising a direct current armature, a plurality of sets of brushes taking current from said armature, each set having the same number of brushes as there are leads for the armature of a corresponding motor and controlling the potential conditions at such leads, a setting member and means actuated by the setting member to turn different sets of brushes to different extents simultaneously, to set up by the different receiver motors different components of a signal set by the transmitter.

4. In a transmission system, the combination with coarse and fine receivers, of controlling means therefor comprising a direct current armature, two sets of brushes taking current from said armature and controlling respectively said coarse and fine receivers, a member for setting up a signal to be transmitted, and means actuable by said member for shifting the two sets of brushes simultaneously but to different extents.

5. In a transmission system, the combination with coarse and fine receivers, of controlling means therefor comprising a direct current armature, two sets of brushes taking current from said armature to control respectively said coarse and fine receivers, rotatable rings for carrying the different sets of brushes, and gearing connection between said rings to cause the sets of brushes and consequently the receivers to be turned to different extents.

6. In a transmission system, a transmitter including a power driven direct current armature, means for producing a magnetic field for the armature, a set of movable brushes for taking current from the armature and means for moving the brushes to vary the potential conditions thereat, a receiver, electrical connections between the brushes and the receiver whereby the receiver is actuated in accordance with the movement of the brushes and means in the electrical connections for introducing corrections into the receiver.

7. In a transmission system, a transmitter including a power-driven direct current armature, means for producing a magnetic field for the armature a set of brushes to take current therefrom and settable to different positions, and means to shift said brushes to vary the potential conditions thereat, a receiver to be controlled in accordance with the setting of said brushes and a device interposed between said transmitter and receiver and comprising a generator having a field structure connected at various points with said brushes, an armature, brushes for taking current from the armature and connected with the field of the receiver and means for shifting the brushes with respect to the armature to introduce corrections into the receiver.

8. In a transmission system, the combination with a synchronous receiver motor having a polyphase armature, a device comprising a direct current generator including means for producing a magnetic field, an armature, a commutator and brushes engaging the commutator and connected with the armature of the receiver motor, a transmitter for controlling the field of the device to vary the potential conditions at the brushes and thereby turn the receiver motor and means for producing relative displacement between the brushes and the field of the device to produce correctional turning of the receiver motor.

9. In a transmission system, the combination with a synchronous receiver motor having an armature provided with polyphase leads, a device comprising means for producing a magnetic field, a direct current armature, a commutator associated with the armature and brushes engaging the commutator and connected to the armature leads, a transmitter for controlling said field producing means to vary the potential conditions at the brushes and thereby turn the receiver motor and means for shifting the brushes with respect to the commutator to produce correctional turning of the receiver motor.

10. In a transmission system, the combination with a synchronous receiver motor having an armature with polyphase leads, a device comprising means for producing a magnetic field, an armature, a commutator associated with the armature and brushes engaging the commutator and connected with the armature leads of the receiver motor, a transmitter for controlling the receiver motor through the device, said transmitter comprising a power driven direct current armature having a commutator, brushes engaging the commutator and connected to the field producing means for moving the brushes of the transmitter to vary the potential conditions at the device and thereby turn the receiver motor and means for shifting the brushes of the device with respect to its commutator to produce correctional turning of the receiver motor.

11. In a transmission system, a transmitter for generating polyphase current of variable frequency, a receiver electrically connected to the transmitter and operated by the current generated by the transmitter and means interposed in the connections between the transmitter and receiver for introducing corrections into the receiver.

12. In a transmission system, a transmitter for generating polyphase current of variable frequency, a receiver operated thereby, means interposed between the transmitter and receiver for changing the phase relation of the current in the receiver with respect to the transmitter, such interposed means comprising a stator energized by the current from the transmitter, a rotor having a cummutator and means including movable brushes to transmit power from said commutator to said receiver.

13. In a transmission system, a transmitter for generating polyphase current of variable frequency, a receiver operated thereby, means interposed between the transmitter and receiver for changing the phase relation of the current in the receiver with respect to the transmitter, such interposed means comprising a stator energized by the current from the transmitter, a rotor having a commutator, means including brushes to receive polyphase current from said commutator for actuating said receiver and means to shift said brushes on said commutator to effect such change in phase relations.

14. In a transmission system, a transmitter for generating polyphase current of variable frequency, a receiver controllable by such current, and controlling means interposed between the transmitter and receiver and comprising a stator energized by such current, a rotor driven by outside power and having commutating means, brushes to take current from said commutating means for actuating the receiver, and means for shifting said brushes to vary the movement of the receiver.

15. In a transmission system, a transmitter for generating polyphase current of variable frequency, a receiver operated by such current, a relay interposed between the transmitter and the receiver, and means to control the relay for changing the phase relation of the current in the receiver with respect to the transmitter.

16. In a transmission system, the combination with a plurality of polyphase receiver motors adapted to be turned to different positions by setting up at the armature leads thereof different potential conditions, of a transmitter comprising an armature having commutating means, a plurality of sets of brushes taking current from said commutating means and supplying it to the receiver motors, each set having the same number of brushes as there are leads for the armature of a corresponding receiver motor and controlling the potential condition at such leads, and means for turning said sets of brushes to set the receivers to different positions.

17. In a transmission system, the combination with a plurality of receiver motors adapted to be turned to different positions by setting up at the armature leads thereof different potential conditions, of a transmitter comprising an armature having commutators at the opposite ends thereof, a plurality of sets of brushes each taking current from one of the commutators and having the same number of brushes as there are leads for the receiver motor connected therewith, and means for turning said sets of brushes to turn the receivers accordingly.

18. In a transmission system, a transmitter for generating polyphase current of variable frequency, a receiver, circuit connections between the transmitter and the receiver and means interposed in the connections for changing the phase relation of the current in the receiver with respect to the transmitter.

19. In a transmission system, a transmitter comprising a motor having an armature with commutating means, means to take polyphase current of variable frequency from the commutating means, a receiver, circuit connections between the means and the receiver for operating the receiver by the polyphase current and means interposed in the circuit connections for changing the phase relation of the current in the receiver with respect to the transmitter.

In testimony whereof I affix my signature.

HARRY L. TANNER.